Nov. 12, 1968    G. NATHAN    3,410,689
FISH OR CRUSTACEAN BAIT
Filed Oct. 22, 1965
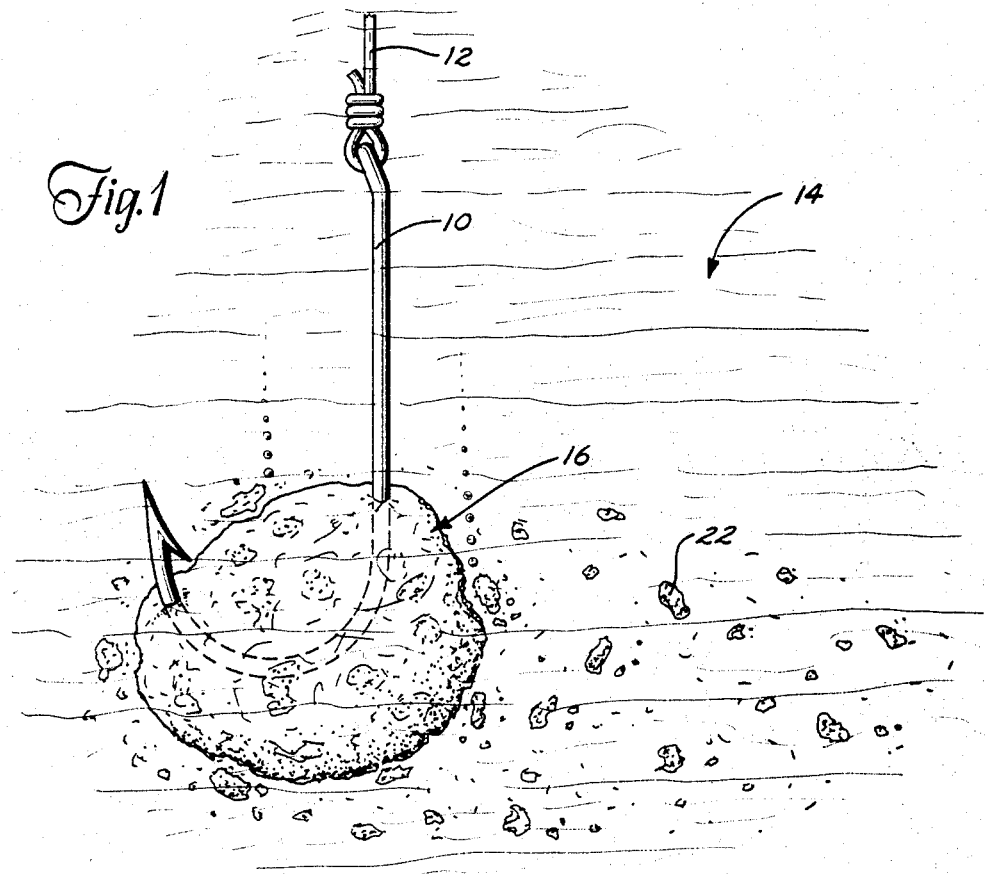
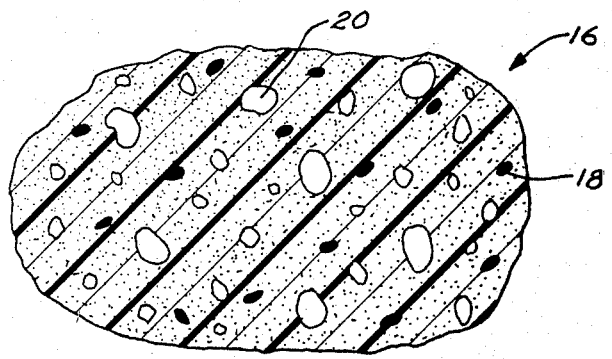
INVENTOR
GERD NATHAN
BY Lawrence R. Hepler
ATTORNEY

United States Patent Office 3,410,689
Patented Nov. 12, 1968

3,410,689
FISH OR CRUSTACEAN BAIT
Gerd Nathan, Springfield, Va., assignor to Nathan Industries, Inc., Springfield, Va., a corporation of Virginia
Filed Oct. 22, 1965, Ser. No. 501,697
5 Claims. (Cl. 99—3)

ABSTRACT OF THE DISCLOSURE

Production of fish or crustacean bait by admixing a foamed plastic with a fish attractant under conditions whereby said attractant is suspended within the structural portion of said plastic, said bait disjoining when submerged in water.

---

This invention relates to fish or crustacean bait and, more particularly, to artificial fish or crustacean bait of the type which dispenses a fish attractant.

Edible fish or crustacean bait, either live or formed from natural food supplies, are very successful when used to attract fish. However, due to problems involved in obtaining, storing, transporting and handling such bait, artificial lures have become very popular. Many types of artificial fish lures are available, each having their merits and disadvantages. Generally speaking, lures are expensive and require considerable skill in their manipulation in order to attract fish. While to an experienced fisherman lures can be quite successful, to an inexperienced fisherman they can prove fruitless. Another disadvantage of the artificial lure is the very limited regional extent over which the lure is effective. To overcome this it is common practice to "chum" or, in other words, throw edible fish bait into the water to attract the fish to the vicinity of the lure. A further disadvantage of lures is their limited use for line fishing and their unavailability for commercial use in traps or nets.

Accordingly, it is one object of this invention to provide an improved artificial fish or crustacean bait which is easy to store, transport and handle.

It is another object of this invention to provide an improved artificial fish or crustacean bait to be used with hooks for line fishing and which also can be used commercially in nets or traps.

It is a further object of this invention to provide an improved artificial fish or crustacean bait which is effective for substantial distances from the hook, net or trap where the bait is located.

A still further object of this invention is to provide an improved artificial fish or crustacean bait which can be inexpensively manufactured and which has physical characteristics capable of being varied to suit the type of use intended.

These and other objects and attendant advantages will become apparent from the below description and the drawings in which, FIGURE 1 is a perspective view of a piece of bait formed in accordance with this invention in use on a fish hook.

FIGURE 2 is a magnified sectional view of bait formed in accordance with this invention illustrating a fish attractant contained integrally within the solid structure of the bait.

Adverting to FIGURE 1, there is shown a fish hook 10 attached to a fish line 12 and suspended in water 14. Mounted on the hook 10 is a piece of fish bait 16 formed in accordance with this invention. The bait is formed of a plastic foam, such as a polyurethane foam, having a fish attractant integrally mixed within the solid plastic structure. As can be seen in FIGURE 2, a fish attractant 18 is integrally contained or suspended within the structural portion of the plastic foam 20. This is to be distinguished from suspending a substance within the interstices 20 of a porous object such as a foamed plastic or sponge.

The bait is manufactured by the well known conventional method of forming foamed plastics. Conventionally foamed plastics are made by admixing two reactants which polymerize and yield a gaseous product which effects the foam structure. If necessary, blowing agents can be added which volatilize during the polymerization to provide additional gas for foaming. Further discussion of forming foamed plastics is not needed due to the well developed state of this art. However, in order to properly support the fish attractant within the plastic foam, an additional step is required in the process. To form the fish or crustacean bait of this invention a third ingredient, a fish attractant, is mixed with one or both of the conventional reactants prior to the inducement of the chemical reaction or polymerization. The attractant may or may not be soluble in the reactants but, in either case, becomes an integral part of the structural portion of the foamed plastic. The third ingredient is a fish attractant 18 which has a scent or taste attractive to fish and crustaceans. Examples of such attractants are: dehydrated fish meal, fish oil, dried slaughterhouse waste products, powdered fish, egg, dried milk products, molasses or other substances attractive to the food detective senses of fish and crustaceans. Additionally, or in the alternative, a dye such as vegetable coloring can be used which conforms in color to the secretion that it is desired to imitate which attracts or lures fish and crustaceans.

The bait 16 is formed so as to disjoin or break up into small particles 22 in water. As the bait disjoins into small particles, the particles 22 are dispensed into the water 14 surrounding the hook 10 and, since the attractant 18 is an integral part of the bait, the attractant is similarly dispensed. The bait particles are carried away from the hook 10 by the natural flow of water and the intensity of the attractant in the water gradually diminishes outwardly from a maximum intensity immediately adjacent to the hook.

The density of foamed plastics can be controlled by varying the percentages of the reactants so that the bait can float, sink or be suspended in water, depending upon the type of fishing intended. The rate of disjoinder of the bait can also be varied by varying the quantity of attractant 18 added to the reactants. The greater the quantity of attractant, the faster will be rate of disjoinder of the bait.

While the above discussion has been directed at the use of the bait with a fish hook, it is obvious that the bait is also usable in nets or traps for fish or crustaceans. There is no need for manipulation of the bait to attract the fish or crustaceans, since they will be attracted by the color scent and/or taste dispensed by the bait 16.

The bait may be packaged in a manner to inhibit the exudation of odor prior to use such as by enclosing it in a plastic bag. There is no need for refrigeration, nor any other special treatment of the bait, thus making this bait extremely attractive in its ability to be stored under any normal existing conditions without harmful effects to the bait or disturbing effects on the area or on objects in which the bait is stored. Another advantage is the elimination of the need to properly store and handle conventional bait in order to maintain its sanitary condition, since the bait formed in accordance with this invention will not deteriorate or decompose producing the results associated with deterioration of food products. By being a foamed plastic, the bait is easy to handle and can be purchased and stored in bulk quantities and cut or broken to a desired size when ready for use. The remaining, unused portion can be restored for future use. Another advantage to this bait is the elimination of the unpleasant tactile sensations experienced by many people when handling live bait or bait formed from natural food supplies.

While a specific type of plastic and specific attractants have been described above, it is clear that this invention is intended to include other compositions which produce the same results, i.e., a water disjointable structure which dispenses material which is odoriferous, tasteful and/or visually pleasant to fish or crustaceans.

What is claimed as new and desired to be secured by Letters Patent of the United States is:

1. Fish or crustacean bait comprising a mass of foamed plastic having a fish attractant integrally formed as a part thereof and suspended within the structural portion of the plastic foam, said bait disjoining when submerged in water to effect dispensing of particles of said bait in said water.

2. Bait as defined in claim 1 wherein said attractant has a scent attractive to fish or crustaceans.

3. Bait as defined in claim 1 wherein said attractant has a taste attractive to fish or crustaceans.

4. Bait as defined in claim 1 wherein said attractant is selected from the group consisting of dehydrated fish meal, fish oil, dried slaughterhouse waste products, dried milk products, molasses, dye, powdered fish and egg.

5. A process for producing fish or crustacean bait comprising the steps of,
  (a) providing foamed plastic producing reactants,
  (b) admixing with at least one of said reactants a fish attractant, and
  (c) admixing said reactants under conditions producing a foamed plastic having said attractant formed as an integral part thereof and suspended within the structural portion of said foam, thereby enabling the bait to become disjoined when submerged in water to effect dispensing of particles of said bait in said water.

References Cited

Vorontsov, N. N.: article in Biological Abstracts, vol. 43, September 1963, No. 21971.

RAYMOND N. JONES, *Primary Examiner.*

S. E. HEYMAN, *Assistant Examiner.*